United States Patent
Ohashi et al.

(10) Patent No.: US 8,232,501 B2
(45) Date of Patent: Jul. 31, 2012

(54) PLASMA ARC POWER SUPPLY AND CONTROL METHOD THEREFOR

(75) Inventors: Masahiro Ohashi, Osaka (JP);
Takayuki Nishisako, Osaka (JP);
Tetsuro Ikeda, Osaka (JP)

(73) Assignee: Sansha Manufacturing Co., Ltd., Osaka (JP)

( * ) Notice: Subject to any disclaimer, the term of this patent is extended or adjusted under 35 U.S.C. 154(b) by 1231 days.

(21) Appl. No.: 12/016,736

(22) Filed: Jan. 18, 2008

(65) Prior Publication Data
US 2009/0084768 A1  Apr. 2, 2009

(30) Foreign Application Priority Data
Sep. 27, 2007  (JP) ................................. 2007-252563

(51) Int. Cl.
*B23K 10/00*  (2006.01)
(52) U.S. Cl. .......... 219/121.57; 219/121.54; 219/121.59
(58) Field of Classification Search ............. 219/121.54, 219/121.59, 121.57, 75, 121.5
See application file for complete search history.

(56) References Cited

U.S. PATENT DOCUMENTS

| | | | | |
|---|---|---|---|---|
| 5,235,162 A | * | 8/1993 | Nourbakhsh | 219/121.54 |
| 5,831,237 A | * | 11/1998 | Daniel | 219/121.54 |
| 6,350,960 B1 | * | 2/2002 | Norris | 219/121.54 |
| 7,127,542 B2 | * | 10/2006 | Parameswaran | 710/302 |
| 2009/0078686 A1 | * | 3/2009 | Winn | 219/121.57 |

FOREIGN PATENT DOCUMENTS
JP  H11-254144 A  9/1999
* cited by examiner

*Primary Examiner* — Mark Paschall
(74) *Attorney, Agent, or Firm* — Global IP Counselors, LLP

(57) ABSTRACT

A plasma arc power supply with a simple structure and its control method enable shifting from a pilot arc to a main arc. A plasma arc power supply used in a plasma arc apparatus that processes a workpiece by forming a pilot arc between a main electrode and a nozzle electrode and subsequently forming a main arc between the main electrode and the workpiece includes N direct current power supply units (N≧2) having negative terminals connected to the main electrode and positive terminals to the workpiece, and a switch between the fourth power supply unit and the workpiece. The fourth power supply unit is connected to cause the nozzle electrode to have an opposite polarity to the main electrode. When the switch is open, the fourth power supply unit supplies a small current between the main electrode and the nozzle electrode while forming a pilot arc between them.

9 Claims, 8 Drawing Sheets

PLASMA ARC POWER SUPPLY AND CONTROL METHOD THEREFOR

BACKGROUND OF THE INVENTION

1. Field of the Invention

The present invention relates to a plasma arc power supply including a plurality of power supply units used in a welding machine or a cutting machine and a control method for the plasma arc power supply.

2. Description of the Related Art

A power supply for a plasma arc used in plasma cutting or plasma welding is required to be compact and lightweight and is formed by a direct current (DC) power supply including an inverter. When a large output is required, a plasma arc power supply may include a plurality of DC power supplies that are driven in parallel.

Each of the DC power supplies first rectifies and smoothes an input alternating current (AC), which is for example commercial power, thereby converting the AC to a DC. Each DC power supply next converts the DC to a high-frequency AC using a high-frequency inverter circuit, which is formed by a semiconductor switching element, such as an IGBT (insulated gate bipolar transistor), a MOSFET (metal oxide semiconductor field-effect transistor), and a bipolar transistor. Each DC power supply rectifies and smoothes the high-frequency AC using a transformer to generate a DC output. Finally, each DC power supply supplies the DC output to a torch and a base material as loads. The operating frequency of the switching element of such a DC power supply is controlled based on feedback using an error signal indicating a difference between an output current detection signal and a reference signal. Such feedback control enables the DC power supply to supply a constant current to the load.

To start an arc, a pilot arc with a small current is first formed between a nozzle electrode and a main electrode of the torch. The torch then moves toward the base material to cause shifting from the pilot arc to a plasma arc (main arc) with a large current formed between the main electrode and the base material.

To form a pilot arc, the plasma arc power supply may include a DC power supply for a pilot arc in addition to the main power supplies. The DC power supply for a pilot arc may have a negative terminal connected to the main electrode and a positive terminal connected to the nozzle electrode (see, for example, Japanese Unexamined Patent Publication No. H11-254144).

However, the DC power supply for a pilot arc, which is arranged in addition to the main power supplies as described in Japanese Unexamined Patent Publication No. H11-254144, increases the number of components and complicates the structure of the plasma arc power supply, and consequently increases the cost of the entire plasma arc power supply.

SUMMARY OF THE INVENTION

It is an object of the present invention to provide a plasma arc power supply with a simple structure that enables shifting from a pilot arc to a main arc, and a control method for such a plasma arc power supply.

A plasma arc power supply according to one aspect of the present invention is a power supply used in a plasma arc apparatus that processes a workpiece by forming a pilot arc between a main electrode and a nozzle electrode of the plasma arc apparatus and subsequently forming a main arc between the main electrode and the workpiece. The power supply includes N direct current power supply units (N is an integer greater than or equal to 2) each having positive and negative terminals, the terminals being connected to the main electrode and the workpiece, and a switch arranged between a first direct current power supply unit that is one of the N direct current power supply units and the workpiece. The first direct current power supply unit is connected to be operable to cause the nozzle electrode to have an opposite polarity to the main electrode. When the switch is open, the first direct current power supply unit supplies a small current between the main electrode and the nozzle electrode while forming a pilot arc between the main electrode and the nozzle electrode.

In this plasma arc power supply, one of the N direct current power supply units (first direct current power supply unit) is used to form a pilot arc. This structure eliminates the need for a power supply dedicated to a pilot arc. Thus, this plasma arc power supply has a simple structure and is formed at a low cost.

After the pilot arc is formed, a second direct current power supply unit that is another one of the N direct current power supply units solely supplies a small current between the main electrode and the workpiece while forming a main arc between the main electrode and the workpiece. When a load current exceeding a small current region is set, the second direct current power supply unit increases the small current to a predetermined value. It is preferable that when the current from the second direct current power supply unit reaches the predetermined value, the remaining direct current power supply units start supplying currents and a total output of the N direct current power supply units is used as the load current.

In this plasma arc power supply, after a pilot arc is formed, one of the N direct current power supply units (second direct current power supply unit) solely supplies a small current while forming a main arc. The direct current power supply unit used to form the main arc is solely used to supply a current with a value up to the predetermined value. This enables the plasma arc power supply to output a stable load current even in a small current region although an output in such a small current region can often become unstable. As a result, the plasma arc power supply reduces power consumption in the small current region.

It is preferable that the first direct current power supply unit stops supplying the current between the main electrode and the nozzle electrode when a predetermined time elapses after the second direct current power supply unit starts supplying the current between the main electrode and the workpiece.

In this plasma arc power supply, the first direct current power supply unit continuously supplies the pilot arc current until a predetermined time elapses after the second direct current power supply unit starts supplying a current. This enables shifting from a pilot arc to a main arc while allowing the pilot arc and the main arc to be continuous with each other.

It is preferable that the predetermined time is in a range of 10 to 1000 milliseconds.

In this plasma arc power supply, the first direct current power supply unit stops supplying the pilot arc current when a relatively short time elapses after the second direct current power supply unit starts supplying a current. Thus, loss caused by the pilot arc current is only small.

It is preferable that the switch has been closed when the remaining direct current power supply units start supplying the currents.

In this plasma arc power supply, when the switch is closed, the first direct current power supply unit supplies a current between the main electrode and the workpiece while the first direction current power unit being in parallel with the other direct current power supply units.

A control method for a plasma arc power supply according to another aspect of the present invention is a method for controlling a power supply used in a plasma arc apparatus that processes a workpiece by forming a pilot arc between a main electrode and a nozzle electrode of the plasma arc apparatus and subsequently forming a main arc between the main electrode and the workpiece. The power supply includes N direct current power supply units (N is an integer greater than or equal to 2) each having positive and negative terminals, the terminals being connected to the main electrode and the workpiece. A first direct current power supply unit that is one of the N direct current power supply units is connected to cause the nozzle electrode to have an opposite polarity to the main electrode. The control method includes a step of using the first direct current power supply unit to supply a small current between the main electrode and the nozzle electrode while forming a pilot arc between the main electrode and the nozzle electrode.

With this plasma arc power supply control method, one of the N direct current power supply units (first direct current power supply unit) is used to form a pilot arc. This method eliminates the need for a power supply dedicated to a pilot arc, and enables the plasma arc power supply to have a simple structure and be formed at a low cost.

It is further preferable that the plasma arc power supply control method includes a step of using after the pilot arc is formed a second direct current power supply unit that is another one of the N direct current power supply units to supply a small current between the main electrode and the workpiece while forming a main arc between the main electrode and the workpiece, a step of using the second direct current power supply unit to increase the small current to a predetermined value when a load current exceeding a small current region is set, and a step of using the remaining direct current power supply units to start supplying currents when the current from the second direct current power supply unit reaches the predetermined value and using a total output of the N direct current power supply units as the load current.

With this plasma arc power supply control method, after a pilot arc is formed, one of the N direct current power supply units (second direct current power supply unit) supplies a small current while forming a main arc. The direct current power supply unit used to form the main arc is solely used to supply a current with a value up to the predetermined value. This method enables the plasma arc power supply to output a stable load current even in a small current region although an output in such a small current region can often become unstable. This method enables the plasma arc power supply to reduce power consumption in the small current region.

It is preferable that the first direct current power supply unit stops supplying the current between the main electrode and the nozzle electrode when a predetermined time elapses after the second direct current power supply unit starts supplying the current between the main electrode and the workpiece.

With this plasma arc power supply control method, the first direct current power supply unit continuously supplies the pilot arc current until a predetermined time elapses after the second direct current power supply unit starts supplying a current. This enables shifting from a pilot arc to a main arc while allowing the pilot arc and the main arc to be continuous with each other.

It is preferable that the predetermined time is in a range of 10 to 1000 milliseconds.

With this plasma arc power supply control method, the first direct current power supply unit stops supplying the pilot arc current when a relatively short time elapses after the second direct current power supply unit starts supplying a current. Thus, loss caused by the pilot arc current is only small.

According to the present invention described above, one of the N direct current power supply units is used to form a pilot arc. This eliminates the need for a power supply dedicated to a pilot arc, and enables the plasma arc power supply to have a simple structure and be formed at a low cost.

BEST MODE FOR CARRYING OUT THE INVENTION

Figure 1:
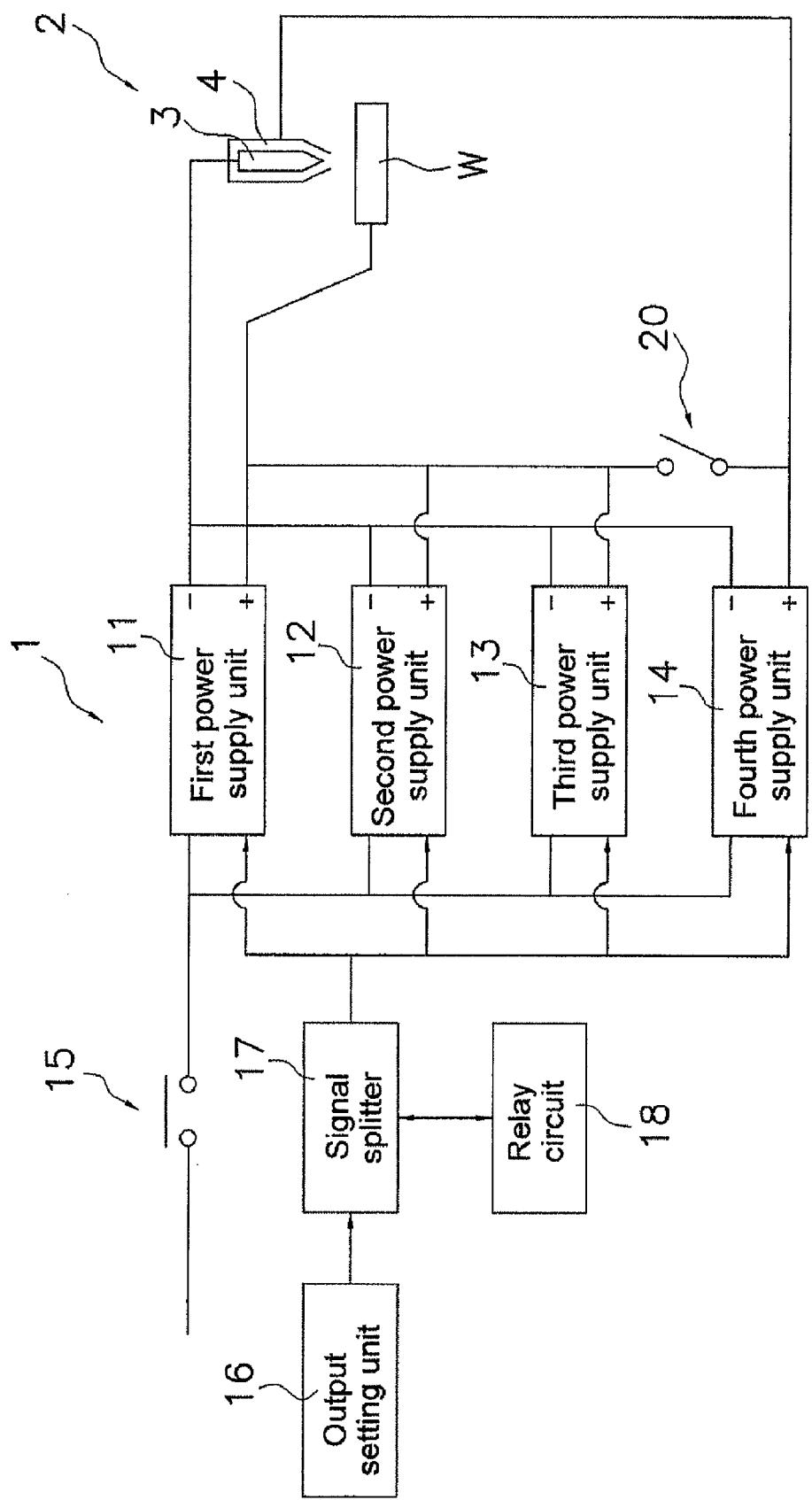
FIG. 1 is a block diagram showing the structure of a plasma arc power supply according to an embodiment of the present invention.
Figure 2:
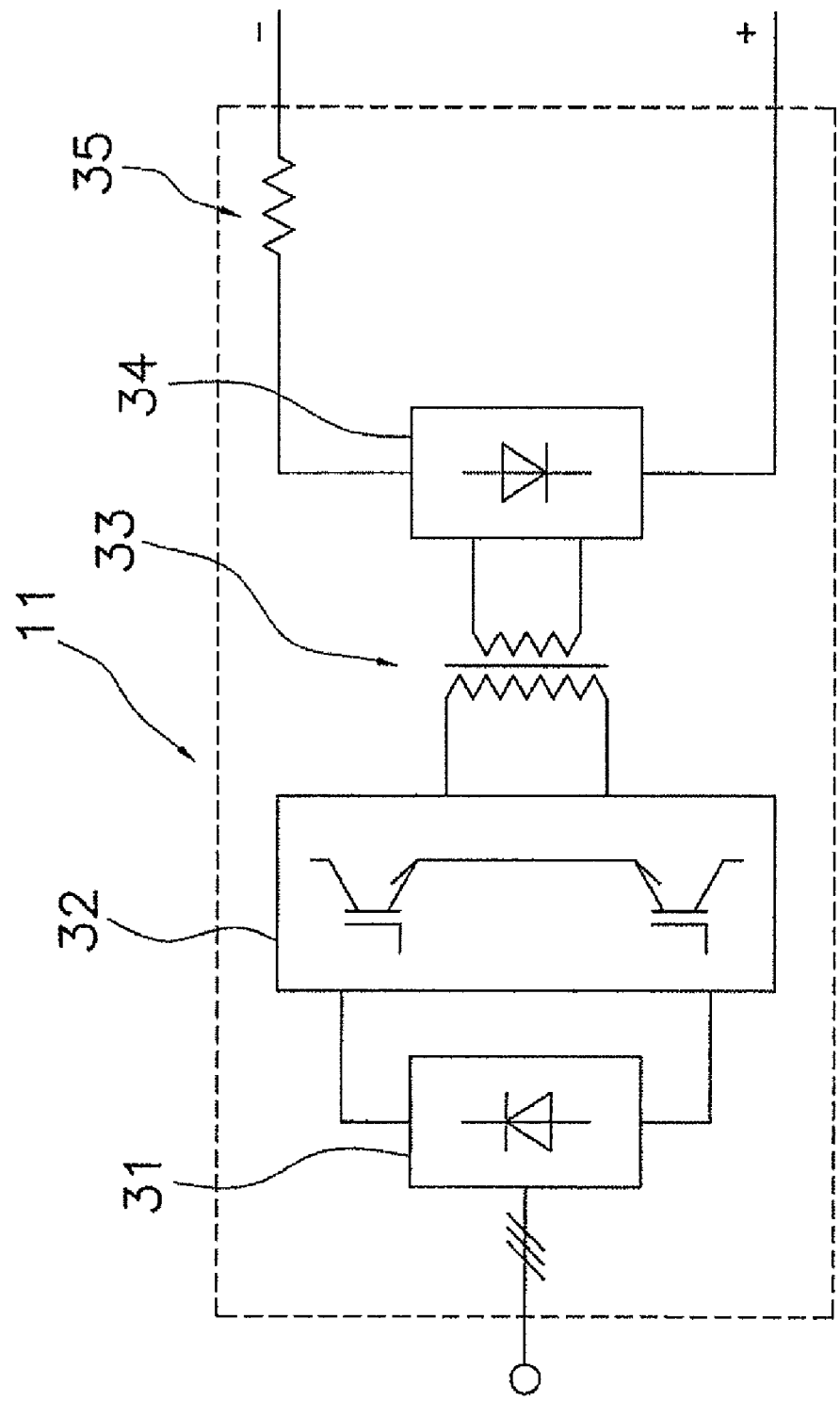
FIG. 2 is a block diagram showing the internal structure of a power supply unit.
Figure 3:
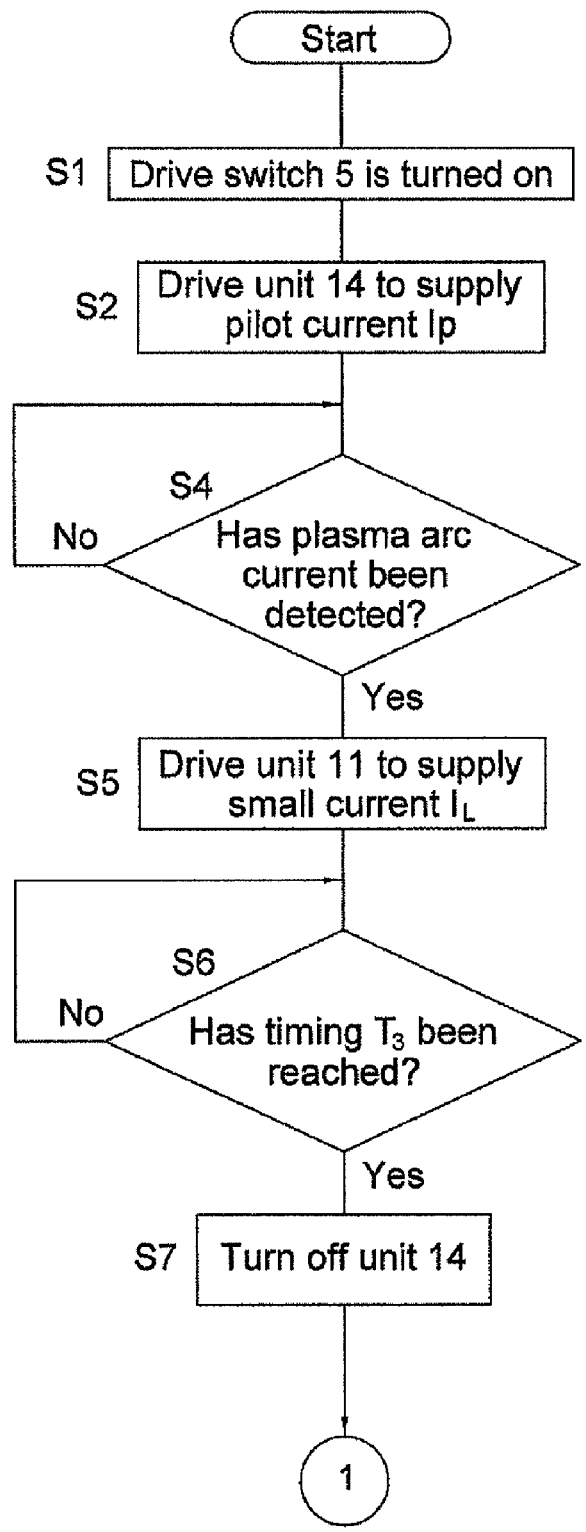
FIG. 3 is a flowchart showing a control process according to the embodiment of the present invention.
Figure 4:
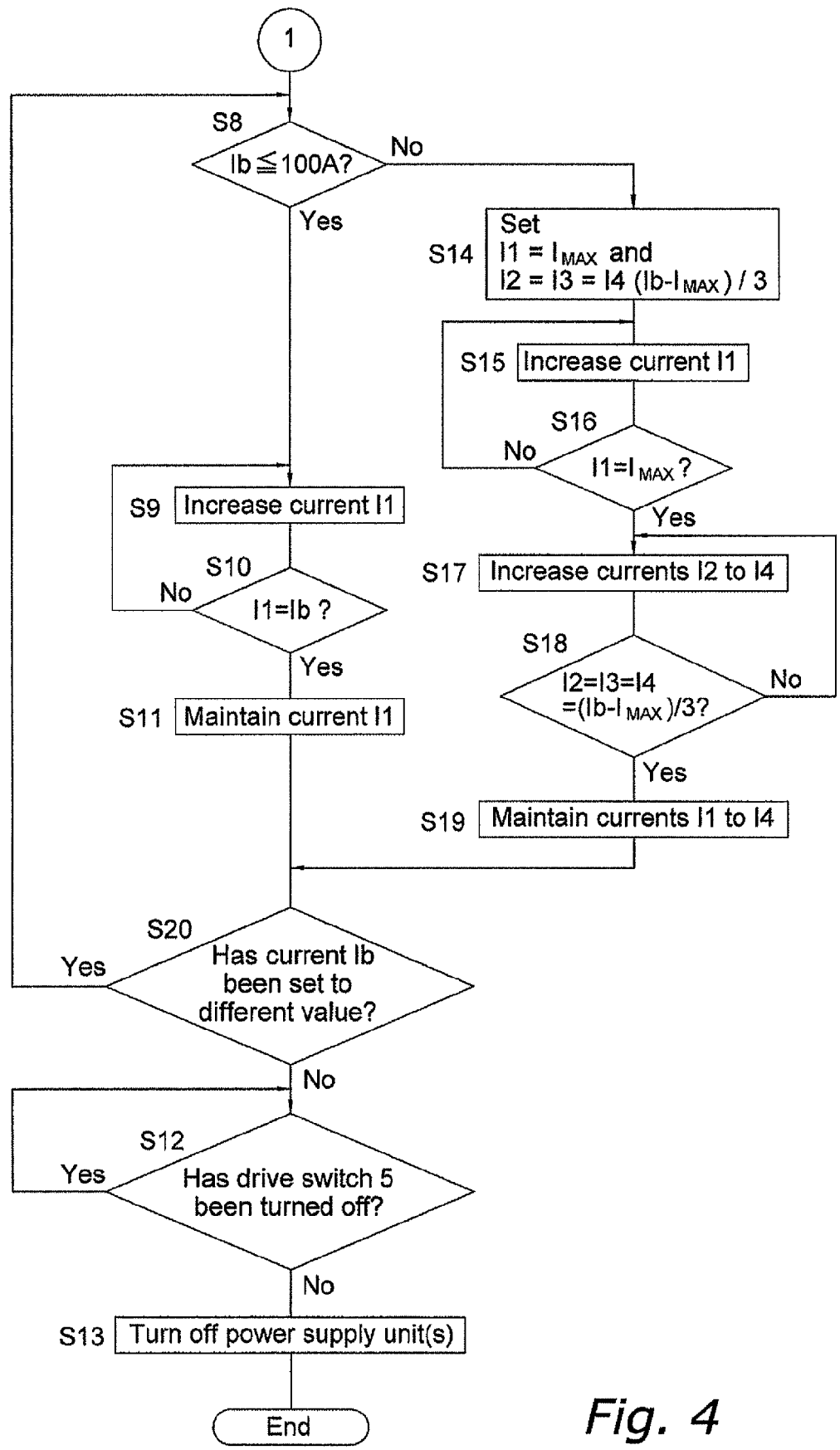
FIG. 4 is a flowchart showing the control process according to the embodiment of the present invention.
Figure 5:
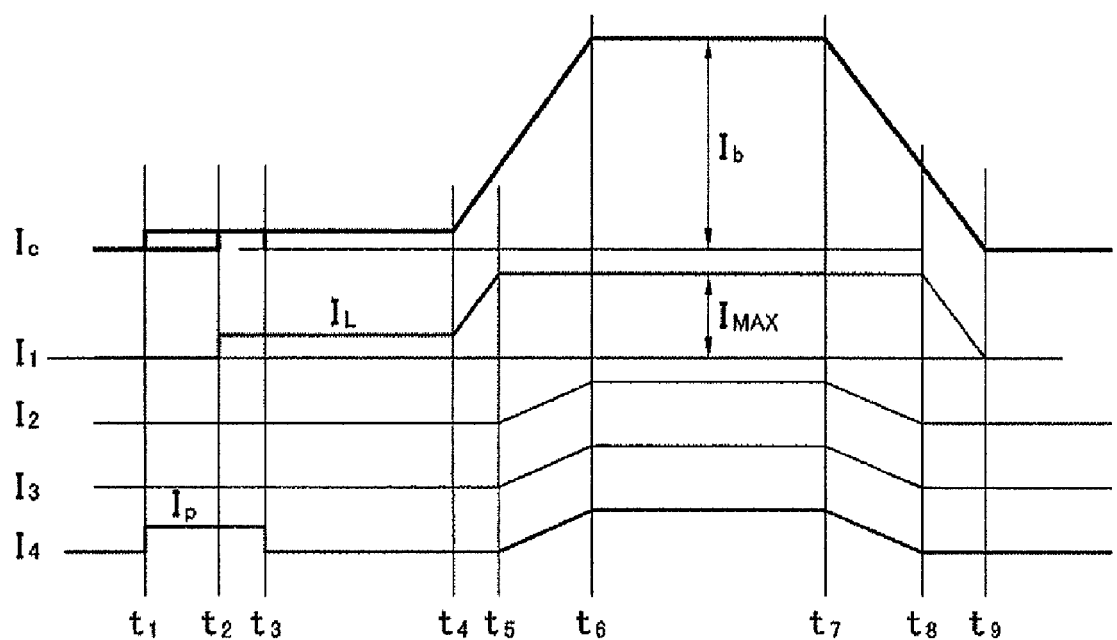
FIG. 5 is a timing chart showing the control process according to the embodiment of the present invention.

An embodiment of the present invention will now be described with reference to FIGS. 1 to 3. FIG. 1 is a block diagram showing a plasma arc power supply 1 according to the embodiment of the present invention. FIG. 2 shows the internal structure of any of power supply units 11 to 14. FIGS. 3 and 4 are flowcharts showing current control according to the embodiment. FIG. 5 is a timing chart for the current control.

(1) Structure of the Plasma Arc Power Supply

The plasma arc power supply 1 shown in FIG. 1 is used in a welding machine or a cutting machine. In the present embodiment, the plasma arc power supply 1 is used in an arc cutting machine 2. The arc cutting machine 2 has a torch including a main electrode 3 and a nozzle electrode 4. The torch is used to cut a workpiece W, which serves as a base material.

The plasma arc power supply 1 is mainly composed of four power supply units 11 to 14. The first power supply unit 11 (second direct current power supply unit) is driven solely to supply a current in a small current region as described later. The second and third power supply units 12 and 13 are driven together with the first and fourth power supply units 11 and 14 when a load current exceeding the small current region is set as described later. The fourth power supply unit 14 (first direct current power supply unit) supplies a current for forming a pilot arc, and is also driven together with the first to third power supply units 11 to 13 when a load current exceeding the small current region is set as described later. The power supply units 11 to 14 have the same structure and are replaceable with one another.

A driving current can be input into the first to fourth power supply units 11 to 14 via a drive switch 15. The first to fourth power supply units 11 to 14 are connected in parallel with each other between the main electrode 3 of the arc cutting machine 2 and the workpiece W. More specifically, the power supply units 11 to 14 have their negative terminals connected to the main electrode 3 and positive terminals connected to the workpiece W. Each of the power supply units 11 to 14 is subjected to constant current control to output a current with a set value. In detail, a current detection current (not shown) detects an output current of each of the power supply units 11 to 14. Based on the detected current amount of each of the power supply units 11 to 14, an inverter control circuit (not shown) executes feedback control of an inverter 32 included in each of the power supply units 11 to 14.

The plasma arc power supply 1 further includes an output setting unit 16, a signal splitter 17, and a relay circuit 18. The signal splitter 17 and the relay circuit 18 control the rise timings of the first to fourth power supply units 11 to 14.

The output setting unit 16 sets the value of a load current supplied to the workpiece W, and inputs the set load current value into the signal splitter 17. The load current value is changeable according to usage of the load current. The signal splitter 17 outputs the load current value set by the output setting unit 16 to the relay circuit 18. More specifically, the signal splitter 17 determines whether only the first power supply unit 11, which is one of the direct current power supply units, is to be driven, or the second to fourth power supply units 12 to 14, which are the remaining direct current power supply units, are also to be driven to supply split currents of the set load current value. The signal splitter 17 provides the determination signal to the relay circuit 18.

The relay circuit 18 generates a relay signal for setting the driving timing of each of the power supply units 11 to 14, and provides the relay signal to each of the power supply units 11 to 14 via the signal splitter 17.

Figure 7:
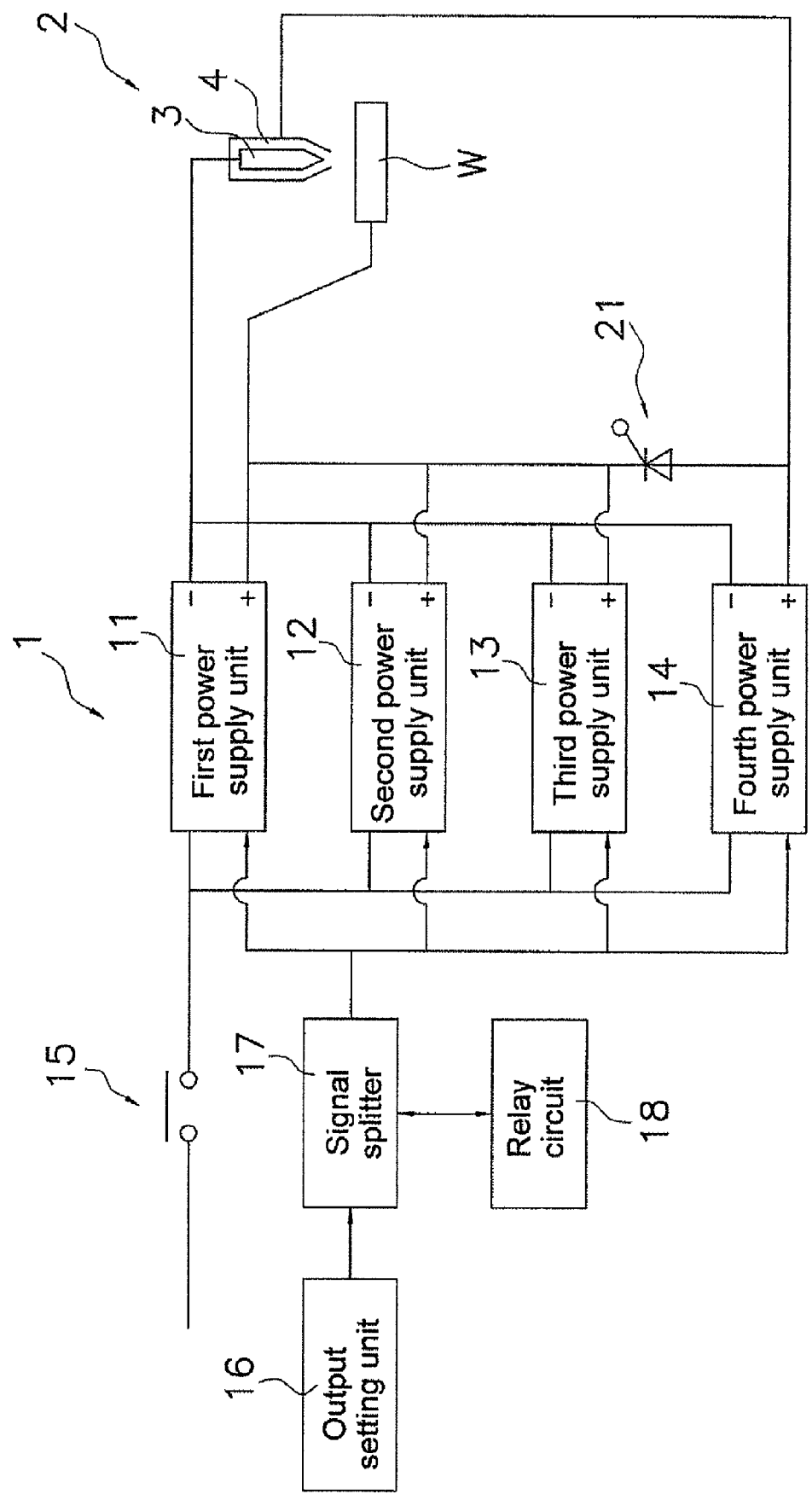
FIG. 7 is a block diagram showing the structure of a plasma arc power supply according to another embodiment of the present invention.
Figure 8:
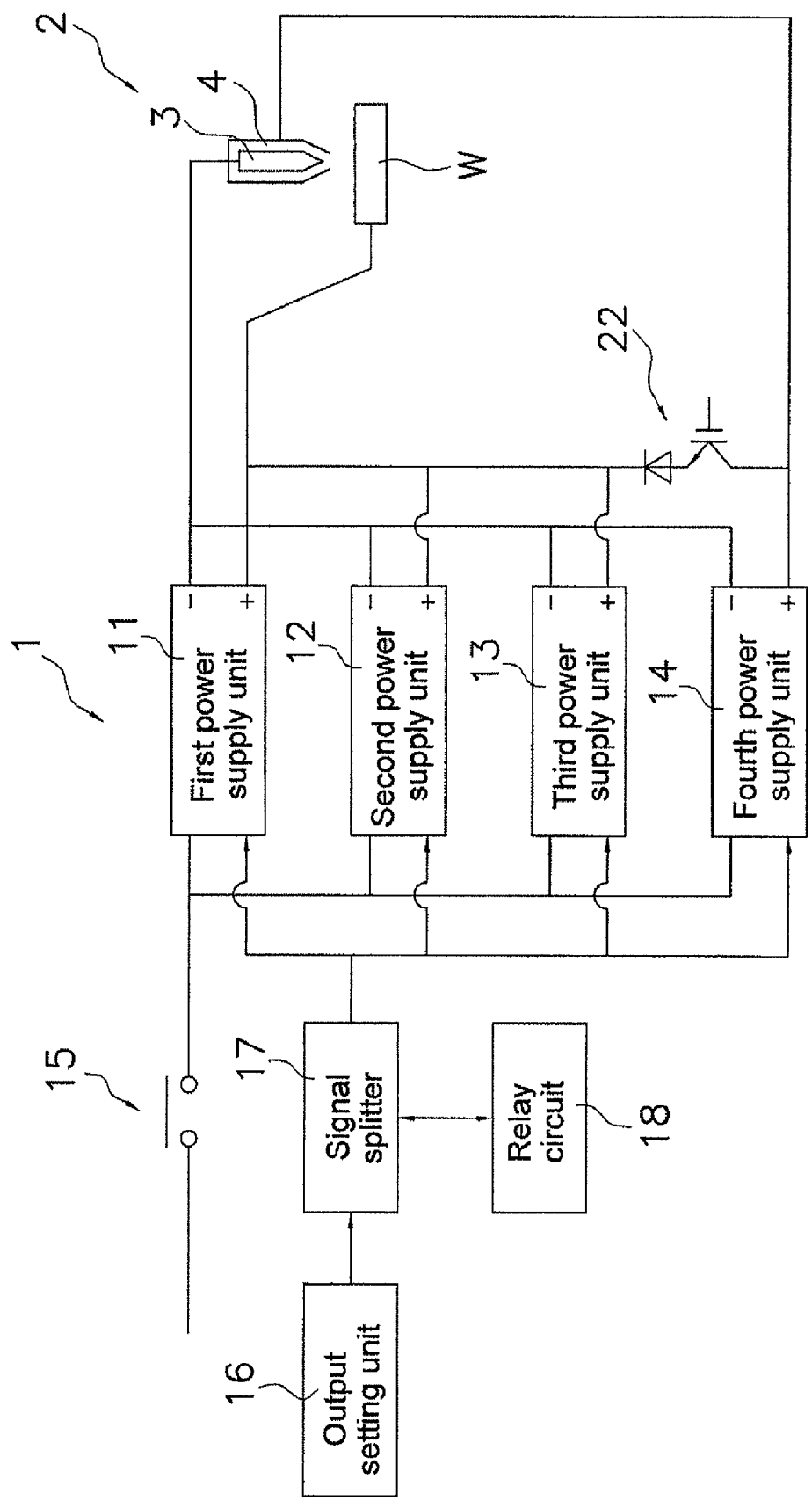
FIG. 8 is a block diagram showing the structure of a plasma arc power supply according to still another embodiment of the present invention.

The positive terminal of the fourth power supply unit 14 is connected to the nozzle electrode 4 of the arc cutting machine 2. Thus, the fourth power supply unit 14 can supply a current for forming a pilot arc with its negative terminal connected to the main electrode 3 and its positive terminal connected to the nozzle electrode 4. A switch 20 is arranged between the positive terminal of the fourth power supply unit 14 and the positive terminals of the other power supply units 11 to 13. The switch 20 is controlled to open and close by a controller (not shown). When the switch 20 is open, the negative terminal of the fourth power supply unit 14 is connected only to the nozzle electrode 4. When the switch 20 is closed, the negative terminal of the fourth power supply unit 14 is connected to the nozzle electrode 4 and the base material W. The switch 20 may be a mechanical switch, or may be a semiconductor switch, such as an SCR (silicon-controlled rectifier) and thyristor 21 shown in FIG. 7 or an IGBT (insulated gate bipolar transistor) 22 shown in FIG. 8.

FIG. 2 shows the internal structure of each of the power supply units 11 to 14. The first power supply unit 11 includes a rectifier 31, an inverter 32, a transformer 33, a rectifier 34, and a smoothing reactor 35. The rectifier 31 converts a commercial alternating current (AC), which is input from a three-phase AC input terminal, to a direct current (DC). The inverter 32 includes a semiconductor switching element, such as an IGBT, a MOSFET (metal oxide semiconductor field-effect transistor), and a bipolar transistor. The inverter 32 converts the DC to a high-frequency AC. The transformer 33, which has a small size, transforms the high-frequency AC. The rectifier 34 converts the AC to a DC. The smoothing reactor 35 smoothes the DC output of the rectifier 34.

(2) Control Method for the Plasma Arc Power Supply

A method for controlling the plasma arc power supply 1 will now be described with reference to the flowcharts shown in FIGS. 3 and 4 and the timing chart shown in FIG. 5. It is assumed that the small current region is a current region not exceeding 100 A and the rated current of each of the power supply units 11 to 14 is 100 A.

Start to Step S7

The processing from the start to step S7 will first be described with reference to the flowchart shown in FIG. 3.

In step S1, a drive switch 5 is turned on and a start signal is output. Then, a starting plasma gas for starting an arc is supplied from a gas valve (not shown) to the torch of the arc cutting machine 2. In step S2, the fourth power supply unit 14 is driven to supply a pilot current IP (t1 in FIG. 5). As a result, a pilot arc is formed between the main electrode 3 and the nozzle electrode 4. The pilot current IP may for example be a current of 30 to 50 A. The switch 20 is open in this state. When the torch moves sufficiently toward the workpiece W, which serves as a load, a plasma arc is formed between the main electrode 3 and the workpiece W (t2 in FIG. 5). When the plasma arc current is detected in step S4, the gas valve closes and opens to exchange gases from the starting plasma gas to a shielding main gas for forming a main arc. In this state, the first power supply unit 11 supplies a small current IL between the main electrode 3 and the workpiece W. The small current IL may for example be a current of 30 to 50 A. When time elapses to reach timing t3 (when a predetermined time elapses after timing t2) in step S6, the fourth power supply unit 14 stops supplying the current in step S7. The predetermined time is in a range of 10 to 1000 milliseconds. During the predetermined time, the pilot arc current IP and the plasma arc current IL are supplied independently. This stabilizes shifting from the pilot arc to the plasma arc. The pilot arc extinguishes immediately after the plasma arc is formed. Thus, loss caused by the pilot arc current is only small.

When the load current Ib is in a small current region not exceeding currents of about 80 to 100 A after the main arc is formed, the single power supply unit (first power supply unit 11) is used to supply the load current Ib. Therefore, the plasma arc power supply 1 outputs a stable current with small energy loss.

Step S8

The signal splitter 17 receives the load current value set by the output setting unit 16, and determines whether the load current value does not exceed 100 A (step S8). The signal splitter 17 outputs the determination result to the relay circuit 18.

Step S9 to Step S11

The processing performed from step S9 to step S11 of the flowchart in FIG. 4 will now be described. FIG. 5 does not show current value changes occurring through these steps.

When the set load current value does not exceed 100 A, the relay circuit 18 provides a relay signal to the first power supply unit 11 via the signal splitter 17 to control the first power supply unit 11 to start increasing or decreasing its current in step S9. Here, the first power supply unit 11 starts increasing or decreasing its current after the current is stabilized. When the current I1 of the first power supply unit 11 reaches the set load current Ib in step S10, the operation of the first power supply unit 11 to increase the current is stopped. In step S11, the current of the first power supply unit 11 is maintained at the set load current value. The second to fourth power supply units 12 to 14 are in a standby state (the second to fourth power supply unit 12 to 14 do not supply currents). When the load current value does not exceed 100 A, the first power supply unit 11 solely supplies a current, and the current of the first power supply unit 11 is used as the load current.

S14 to Step S20

The processing performed from step S14 to step S20 of the flowchart in FIG. 4 will now be described. FIG. 5 shows current value changes occurring through these steps in a right portion of the chart.

When the set load current Ib exceeds 100 A, the relay circuit 18 generates a relay signal to delay driving the power supply units 12 to 14, and provides the power supply units 11 to 14 with the timing to increase their currents via the signal splitter 17. The signal splitter 17 provides each of the power supply units 11 to 14 with a target current value, which is a split current of the set load current Ib, in step S14. More specifically, the target value of the current I1 of the first power supply unit 11 is the rated current IMAX. The target value of each of the currents I2 to I4 of the second to fourth power supply units 12 to 14 is the value (Ib−IMAX)/3. In response to the relay signal provided from the relay circuit 18, the first power supply unit 11 starts increasing its current at timing t4 in step S15 after the current is stabilized in the same manner as described above. When the current I1 of the first power supply unit 11 reaches the rated current of 100 A (=IMAX) in step S16, the second to fourth power supply units 12 to 14 are driven in step S17 to start increasing the currents I2 to I4 (t6 in FIG. 5). The switch 20 is closed in this state. The current of each of the second to fourth power supply units 12 to 14 increases gradually. When the current of each of the second to fourth power supply units 12 to 14 reaches the value (Ib−IMAX)/3 in step S18, the current of each of the second to fourth power supply units 12 to 14 is maintained at that current value in step S19. Alternatively, the second to fourth power supply units 12 to 14 may output the rated current of 100 A, or may output currents lower than the rated current or specifically, for example, currents of 80 to 90 A. When the load current Ib is set to a different value in step S20, the processing from step S8 is performed again.

As described above, the remaining power supply units (second to fourth power supply units) are driven in a manner to increase their currents gradually after the currents are increased sufficiently. This prevents overshoot during startup of the remaining power supply units, and enables welding or cutting to be performed in an optimum manner.

As shown in FIG. 5, the current I1 generated by the first power supply unit 11 is used as the load current in the small current region not exceeding 100 A between timings t3 to t5, and the total of the currents I1 to I4 generated by the first to fourth power supply units 11 to 14 is used as the load current between timings t5 to t7.

Step S12 to End

The processing performed from step S12 to the end of the flowchart in FIG. 4 will now be described. When the drive switch 5 is turned off in step S12 while the load current is supplied, the power supply unit(s) is turned off in step S13. When only the first power supply unit 11 has been driven (steps S9 to S11), the first power supply unit 11 is turned off in step S13. When all the first to fourth power supply units 11 to 14 have been driven (steps S14 to S19), the power supply units 11 to 14 are turned off in step S13. Turning off the power supply unit(s) ends the control process.

All the power supply units 11 to 14 may be turned off simultaneously or may be turned off in stages. As shown in FIG. 5, when the drive switch 5 is turned off, the second to fourth power supply units 12 to 14 start decreasing their supply currents at timing t7. When the supply currents of the second to fourth power supply units 12 to 14 reach zero at timing t8, the first power supply unit 11 starts decreasing its supply current. The supply current of the first power supply unit 11 then reaches zero at timing t9. In this manner, the second to fourth power supply units 12 to 14 are stopped first, and then the first power supply unit 11 is stopped. This reduces overshoot and decreases the output of the plasma arc power supply 1 gradually to zero.

After the output of the first power supply unit 11 reaches a predetermined value, the outputs of the remaining power supply units 12 to 14 can be increased or decreased in synchronization with one another. Thus, the current control of the entire plasma arc power supply 1 is easy.

The power supply units 11 to 14 each having the same structure are used in the present embodiment. The power supply units with the same structure are developed easily and their electric characteristics are easily adjustable. Also, the capacity of the welding machine or the cutting machine can be changed simply by adding power supply units to the machine or removing some of the power supply units of the machine anytime. This makes initial investment to such machines easy. When some of the power supply units of the machine get broken down, only the broken power supply units can be replaced. The plasma arc power supply 1 therefore has higher stability and more environmentally friendly than conventional plasma arc power supplies.

(3) Other Embodiments of the Invention

Figure 6:
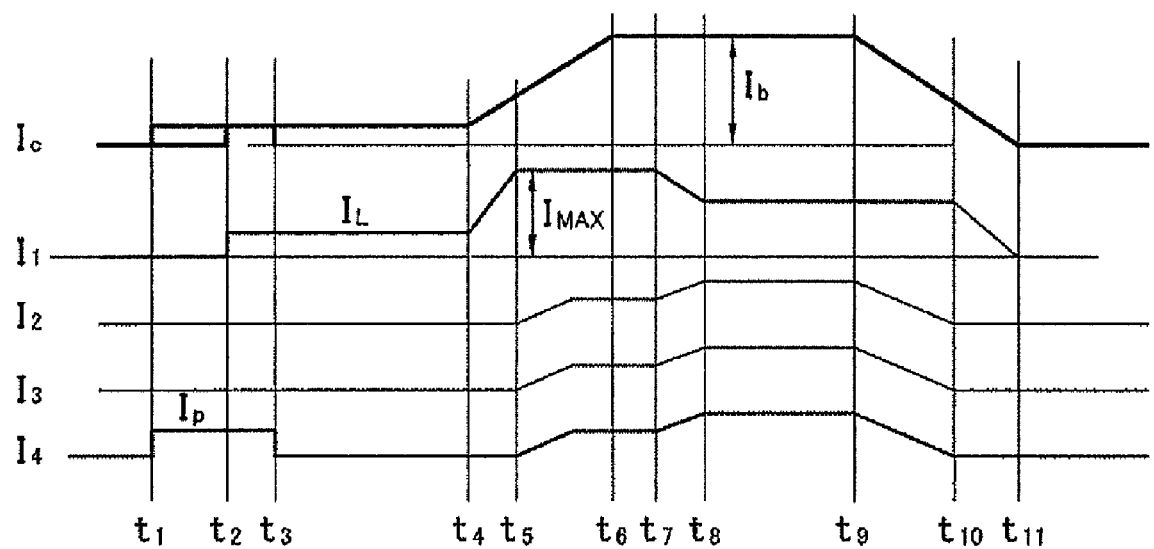
FIG. 6 is a timing chart showing a control process according to another embodiment of the present invention.

A control process according to another embodiment of the present invention will now be described with reference to a timing chart shown in FIG. 6.

The drive switch 5 is turned on and a start signal is output. Then, a starting plasma gas arc for starting an arc is supplied to the torch of the arc cutting machine 2 from the gas valve (not shown). The fourth power supply unit 14 is driven to supply the pilot current IP (t1 in FIG. 6). As a result, a pilot arc is formed between the main electrode 3 and the nozzle electrode 4. The pilot current IP may for example be a current of 30 to 50 A. The switch 20 is open in this state. When the torch moves sufficiently toward the workpiece W, a plasma arc is formed between the main electrode 3 and the workpiece W (t2 in FIG. 6). When the plasma arc current is detected, the gas valve closes and opens to exchange gases from the starting plasma gas to a shielding main gas for forming a main arc. In this state, the first power supply unit 11 supplies a small current IL between the main electrode 3 and the workpiece W. The small current IL may for example be a current of 30 to 50 A. When time elapses to reach timing t3 (when a predetermined time elapses after timing t2), the fourth power supply unit 14 stops supplying the current. The predetermined time is in a range of 10 to 1000 milliseconds. During the predetermined time, the pilot arc current IP and the plasma arc current IL are supplied independently. This stabilizes shifting from the pilot arc to the plasma arc. The pilot arc extinguishes immediately after the plasma arc is formed. Thus, loss caused by the pilot arc current is only small.

When the load current Ib is in a small current region not exceeding currents of about 80 to 100 A after the main arc is formed, the single power supply unit (first power supply unit 11) is used to supply the load current Ib. Therefore, the plasma arc power supply 1 outputs a stable power with small energy loss.

The signal splitter 17 receives the load current value set by the output setting unit 16, and determines whether the load current value does not exceed 100 A. The signal splitter 17 outputs the determination result to the relay circuit 18.

When the set load current Ib exceeds 100 A, the relay circuit 18 generates a relay signal to delay driving the power supply units 12 to 14, and provides the power supply units 11 to 14 with the timing to increase their currents via the signal splitter 17. The signal splitter 17 provides each of the power supply units 11 to 14 with a target current value, which is a split current of the set load current Ib.

In response to the relay signal provided from the relay circuit 18, the first power supply unit 11 starts increasing its current at timing t4 after the current is stabilized in the same manner as described above. When the current I1 of the first power supply unit 11 reaches the rated current of 100 A (=IMAX) at timing t5, the second to fourth power supply units 12 to 14 are driven at timing t6 to start increasing the currents I2 to I4. The switch 20 is closed in this state. Subsequently, the first power supply unit 11 solely supplies the rated current. When the current of each of the second to fourth power supply units 12 to 14 does not reach the rated current (e.g., before and after timing t6) and the cutting or welding operation is continuously performed over a prolonged time, or for example at timing t7, which is the timing at which a predetermined time elapses after timing t5, each of the first power supply unit 11 and the second to fourth power supply units 12 to 14 is provided with a target current value that is 1/n of the load current Ib (¼ in the present embodiment). More specifically, the first power supply unit 11 gradually decreases its current I1 to ¼ of the load current Ib, whereas the second to fourth power supply units 12 to 14 gradually increase the currents I2 to I4 to ¼ of the load current Ib. At timing t8, the currents generated by the power supply units 11 to 14 reach the identical values.

When, for example, the set load current Ib is 200 A and the current generated by the first power supply unit 11 is 100 A and each of the currents generated by the second to fourth power supply units 12 to 14 is 33.3 A (e.g., the current values at timing t6), the first power supply unit 11 starts gradually decreasing the current I1 at timing t7 down to 50 A, and the second to fourth power supply units 12 to 14 start gradually increasing the currents I2 to I4 at timing t7 up to 50 A.

This current control prevents the first power supply unit 11 from operating solely for a prolonged time and alleviates burden on the first power supply unit 11. More specifically, the power supply units equally bear the output current of the plasma arc power supply 1. Thus, the current control becomes easy, and the lifetime of the first power supply unit 11 is improved.

An operation to stop the power supply units 11 to 14 will now be described.

When the drive switch 5 is turned off, the second to fourth power supply units 12 to 14 start decreasing their supply currents at timing t9. The supply currents of the second to fourth power supply units 12 to 14 reach zero at timing t10. The first power supply unit 11 then starts decreasing its supply current. The supply current of the first power supply unit 11 reaches zero at timing t11. In this manner, the second to fourth power supply units 12 to 14 are stopped first, and then the first power supply unit 11 is stopped. This reduces overshoot and decreases the output of the plasma arc power supply 1 gradually to zero.

(4) Modifications of the Invention

In the above embodiments, the relay circuit 18 predicts the timing at which the supply current of the first power supply unit 11 reaches the rated current, and outputs a relay signal for controlling the timing at which the second to fourth power supply units 12 to 14 are to be driven. Alternatively, the relay circuit 18 may output a relay signal to delay driving the second to fourth power supply units 12 to 14, and may start driving the second to fourth power supply units 12 to 14 after detecting that the current I1 of the first power supply unit 11 reaches the current value IMAX.

The current I1 output from the first power supply unit 11 and the currents I2, I3, and I4 output from the other power supply units 12 to 14 at and after timing t6 may be identical to each other or may be different from each other.

In the above embodiments, the second to fourth power supply units 12 to 14 start supplying the currents I2 to I4 at the timing when the current I1 of the first power supply unit 11 reaches its maximum value. Alternatively, the second to fourth power supply units 12 to 14 may start supplying the currents before or after the timing when the current I1 of the first power supply unit 11 reaches the maximum value. It is preferable that the second to fourth power supply units 12 to 14 start supplying the currents at or after the timing when the supply current of the first power supply unit 11 reaches 70% or more of the maximum value.

The rated current of each power supply unit should not be limited to 100 A.

Although the number of power supply units N is 4 in the above embodiments, the number of power supply units may be changed according to usage of the load current.

The present invention is applicable to any power supply for a welding machine or a cutting machine that controls a load current to be constant using a plurality of DC power supplies that are controlled based on feedback.

The control method for the plasma arc power supply of the present invention may be implemented by either hardware or software or by combination of hardware and software. In particular, the control method described above can be implemented as a program, which may be recordable on various recording media.

A diode may be arranged between each power supply unit and the arc cutting machine to prevent the arc cutting machine from short-circuiting with each power supply unit.

The fourth power supply unit 14 functions to supply a pilot arc current in the above embodiments. Alternatively, another one of the power supply units may be used to supply a pilot arc current. Alternatively, a plurality of power supply units may be used to supply a pilot arc current. When a plurality of power supply units are used to supply a pilot arc current, each power supply unit is connected to the nozzle electrode, and a switch is arranged at the output of each power supply unit.

The embodiments and modifications described herein are mere example and should not limit the present invention.

The present invention provides the plasma arc power supply that supplies a stable load current even in a small current region although an output in such a small current region can often become unstable and thereby reduces power consumption in the small current region. Therefore, the present invention has industrial applicability.

This application claims priority to Japanese Patent Application No. 2007-252563. The entire disclosure of Japanese Patent Application No. 2007-252563 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A plasma arc power supply used in a plasma arc apparatus that processes a workpiece by forming a pilot arc between a main electrode and a nozzle electrode of the plasma arc apparatus and subsequently forming a main arc between the main electrode and the workpiece, the power supply comprising:

N direct current power supply units each having positive and negative terminals, the terminals being connected to the main electrode and the workpiece, where N is an integer greater than or equal to 2; and a switch arranged between a first direct current power supply unit that is one of the N direct current power supply units and the workpiece, wherein the first direct current power supply unit is connected to cause the nozzle electrode to have an opposite polarity to the main electrode, and when the switch is open, the first direct current power supply unit supplies a small current between the main electrode and the nozzle electrode while forming a pilot arc between the main electrode and the nozzle electrode, after the pilot arc is formed, a second direct current power supply unit that is another one of the N direct current power supply units solely supplies a small current between the main electrode and the workpiece while forming a main arc between the main electrode and the workpiece, when a load current exceeding a small current region is set, the second direct current power supply unit increases the small current to a predetermined value, and when the current from the second direct current power supply unit reaches the predetermined value, the remaining direct current power supply units start supplying currents and a total output of the N direct current power supply units is used as the load current.

2. The plasma arc power supply according to claim 1, wherein the first direct current power supply unit stops supplying the current between the main electrode and the nozzle electrode when a predetermined time elapses after the second direct current power supply unit starts supplying the current between the main electrode and the workpiece.

3. The plasma arc power supply according to claim 2, wherein
the predetermined time is in a range of 10 to 1000 milliseconds.

4. The plasma arc power supply according to claim 2, wherein
the switch has been closed when the remaining direct current power supply units start supplying the currents.

5. The plasma arc power supply according to claim 2, wherein
the switch has been closed when the remaining direct current power supply units start supplying the currents.

6. The plasma arc power supply according to claim 3, wherein
the switch has been closed when the remaining direct current power supply units start supplying the currents.

7. A plasma arc power supply control method for controlling a power supply used in a plasma arc apparatus that processes a workpiece by forming a pilot arc between a main electrode and a nozzle electrode of the plasma arc apparatus and subsequently forming a main arc between the main electrode and the workpiece, wherein the power supply includes N direct current power supply units each having positive and negative terminals, the terminals being connected to the main electrode and the workpiece, where N is an integer greater than or equal to 2, and a first direct current power supply unit that is one of the N direct current power supply units is connected to cause the nozzle electrode to have an opposite polarity to the main electrode, the method comprising:

a step of using the first direct current power supply unit to supply a small current between the main electrode and the nozzle electrode while forming a pilot arc between the main electrode and the nozzle electrode, a step of using after the pilot arc is formed a second direct current power supply unit that is another one of the N direct current power supply units to supply a small current between the main electrode and the workpiece while forming a main arc between the main electrode and the workpiece;

a step of using the second direct current power supply unit to increase the small current to a predetermined value when a load current exceeding a small current region is set; and a step of using the remaining direct current power supply units to start supplying currents when the current from the second direct current power supply unit reaches the predetermined value and using a total output of the N direct current power supply units as the load current.

8. The plasma arc power supply control method according to claim 7, wherein the first direct current power supply unit stops supplying the current between the main electrode and the nozzle electrode when a predetermined time elapses after the second direct current power supply unit starts supplying the current between the main electrode and the workpiece.

9. The plasma arc power supply control method according to claim 8, wherein
the predetermined time is in a range of 10 to 1000 milliseconds.

* * * * *